(12) United States Patent
Liang et al.

(10) Patent No.: US 12,206,326 B2
(45) Date of Patent: Jan. 21, 2025

(54) VOLTAGE CONVERTER WITH AVERAGE INPUT CURRENT CONTROL AND INPUT-TO-OUTPUT ISOLATION

(71) Applicant: TEXAS INSTRUMENTS INCORPORATED, Dallas, TX (US)

(72) Inventors: Jian Liang, Shanghai (CN); Yao Lu, Shanghai (CN); Chen Feng, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/525,317

(22) Filed: Nov. 30, 2023

(65) Prior Publication Data

US 2024/0120836 A1 Apr. 11, 2024

Related U.S. Application Data

(63) Continuation of application No. 17/563,255, filed on Dec. 28, 2021, now Pat. No. 11,881,770.

(51) Int. Cl.
*H02M 3/155* (2006.01)
*H02M 1/00* (2007.01)

(52) U.S. Cl.
CPC .................. *H02M 3/155* (2013.01)

(58) Field of Classification Search
CPC ................. H02M 3/155; H02M 1/0009
See application file for complete search history.

(56) References Cited

U.S. PATENT DOCUMENTS

| 7,394,633 | B2 | 7/2008 | Sasitornwannakul |
| 10,756,644 | B1* | 8/2020 | Shah .............. H02M 3/07 |
| 10,778,099 | B1 | 9/2020 | Womac |
| 10,784,849 | B1 | 9/2020 | Hunter |
| 2006/0176029 | A1 | 8/2006 | McGinty |
| 2007/0115741 | A1* | 5/2007 | Jung .............. H03F 3/345 |
| | | | 365/205 |

(Continued)

FOREIGN PATENT DOCUMENTS

| CN | 108574411 A | 9/2018 |
| JP | 2009081988 A | 4/2009 |

(Continued)

OTHER PUBLICATIONS

Kumar, S., et al., "A New Short-Circuit Protection Scheme for Boost Converter," IEEE, 2020, 5 pages.

(Continued)

*Primary Examiner* — Sisay G Tiku
(74) *Attorney, Agent, or Firm* — Michelle F. Murray; Frank D. Cimino (57) ABSTRACT

A circuit includes a control circuit having a first control circuit input, a second control circuit input, a first control circuit output, and a second control circuit output, and a first transistor having a first current terminal, a second current terminal, and a control terminal, the control terminal coupled to the first control circuit output, the first current terminal coupled to the first control circuit input and to a second transistor, and the second current terminal adapted to be coupled to the second transistor, a logic circuit having a first logic input, a second logic input, and a logic output, the first logic input coupled to the second control circuit output and a switch having a first switch terminal, a second switch terminal, and a switch control terminal, the switch control terminal coupled to the logic output and the first switch terminal coupled to the second current terminal.

20 Claims, 4 Drawing Sheets

(56) References Cited

U.S. PATENT DOCUMENTS

| | | |
|---|---|---|
| 2007/0216386 A1 | 9/2007 | Hagino |
| 2010/0225240 A1 | 9/2010 | Shearer |
| 2010/0320992 A1 | 12/2010 | Dearn |
| 2012/0274153 A1 | 11/2012 | Maxwell |
| 2018/0074540 A1 | 3/2018 | Wakimoto |
| 2019/0324063 A1* | 10/2019 | Baorda ................ H02M 3/335 |
| 2019/0386561 A1 | 12/2019 | King |
| 2023/0120432 A1 | 4/2023 | Womac |
| 2023/0127446 A1* | 4/2023 | Ramorini ............. H02M 3/158 323/271 |

FOREIGN PATENT DOCUMENTS

| | | |
|---|---|---|
| JP | 2016158366 A | 9/2016 |
| KR | 1020210026102 A | 3/2021 |

OTHER PUBLICATIONS

"TPS61378-Q1 25-μA Quiescent Current Synchronous Boost Converter with Load Disconnect," TPS61378-Q1, SLVSET0D, Texas Instruments, May 2020, Revised Oct. 2021, 36 pages.

Xiao, Z., "An Instantaneously Triggered Short-Circuit Protection Architecture for Boost Switching DC/DC Converters," IEEE Transactions on Power Electronics, vol. 33, No. 7, Jul. 2018, pp. 5677-5685.

"17A, 600kHz, 20V Wide Input Range, Synchronous Boost Converter in a Small 3x4mm QFN Package," MPS The Future of Analog IC Technology, MP342 Rev. 1.0, www.MonolithicPower. com, Oct. 10, 2019, 20 pages.

International Search Report dated May 3, 2023, PCT Application No. PCT/US2022/053333 filed Dec. 19, 2022, 3 pages.

* cited by examiner

VOLTAGE CONVERTER WITH AVERAGE INPUT CURRENT CONTROL AND INPUT-TO-OUTPUT ISOLATION

CROSS-REFERENCE TO RELATED APPLICATION

This application is a continuation of U.S. patent application Ser. No. 17/563,255 filed Dec. 28, 2021, which Application are hereby incorporated by reference in their entirety herein.

BACKGROUND

Many types of voltage regulators are available. One type is a switching regulator in which the duty cycle of one or more switching transistors is controlled based on a feedback signal to regulator the output voltage of the regulator. One type of switching regulator is a boost converter which produces a regulated output voltage that is larger than its input voltage.

SUMMARY

In one example, a circuit includes a control circuit having a first control circuit input, a second control circuit input, a first control circuit output, and a second control circuit output and a first transistor having a first current terminal, a second current terminal, and a control terminal, the control terminal coupled to the first control circuit output, the first current terminal coupled to the first control circuit input and to a second transistor, and the second current terminal adapted to be coupled to the second transistor. The circuit also includes a logic circuit having a first logic input, a second logic input, and a logic output, the first logic input coupled to the second control circuit output and a switch having a first switch terminal, a second switch terminal, and a switch control terminal, the switch control terminal coupled to the logic output and the first switch terminal coupled to the second current terminal.

DETAILED DESCRIPTION

A boost converter converts an input voltage to a higher output voltage. For some applications of a boost converter, the input power source to the boost converter has a relatively small input current limit. For example, some peripheral devices (e.g., barcode readers, cameras, etc.) receive their operating power from a universal serial bus (USB) Type-C cable. USB Type-C are capable of only relatively low power delivery to the peripheral device (e.g., 5V at 500 milliamperes (mA). For such limited input current power sources, it would be advantageous to control the average input current to make efficient use of the input current. Boost converters, whose control regulation circuits regulate the peak or valley input current, may not make efficient use of the full, yet limited, input current capability of the power source. The boost converter described herein has a control circuit that controls the average (DC) input current. The described boost converter also provides control for start-up or output short-circuit conditions.

Figure 1:
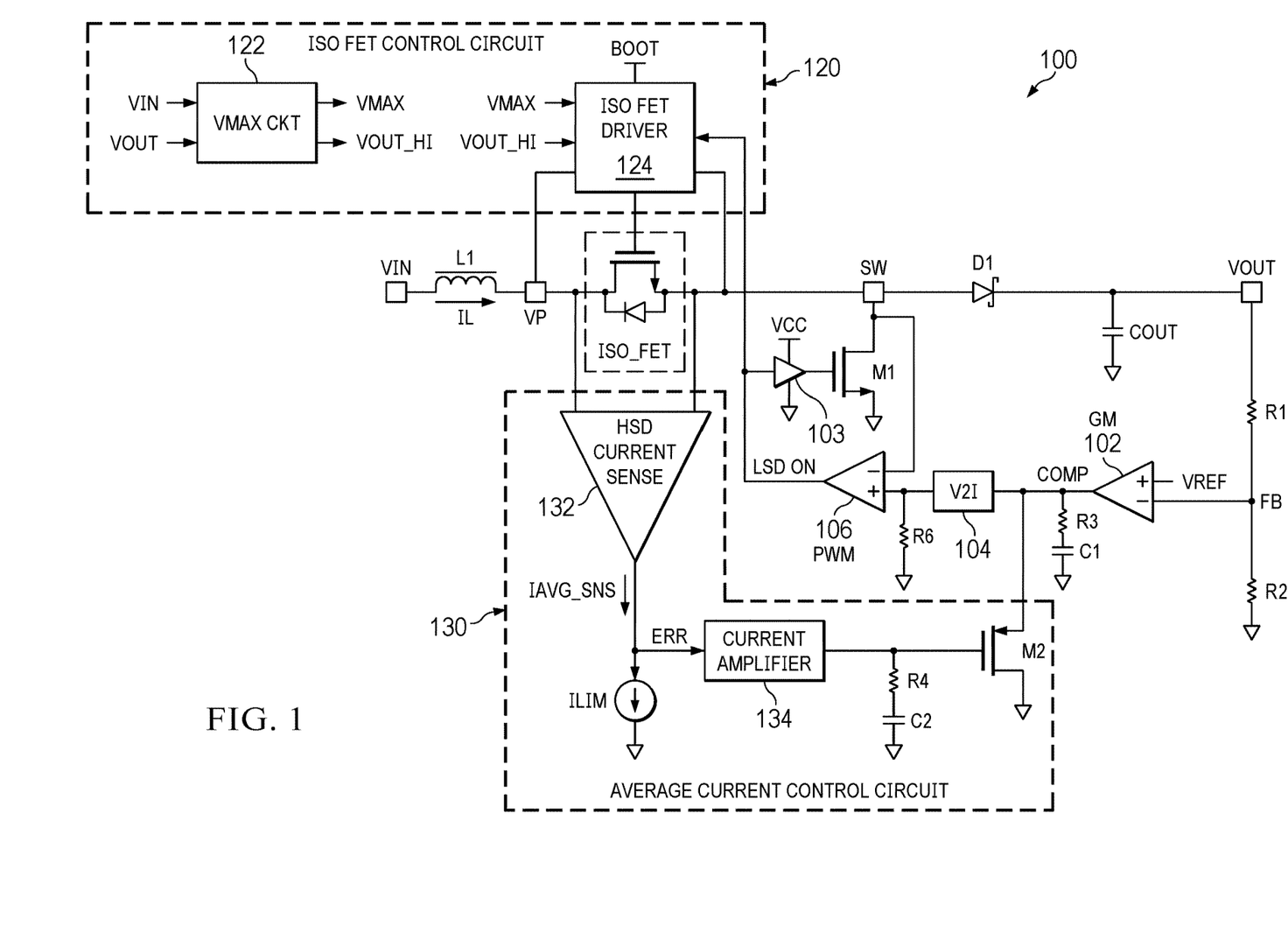
FIG. 1 is a schematic of a boost converter in accordance with an example.

FIG. 1 is a schematic of a boost converter 100 in accordance with an example. Boost converter 100 includes an input (VIN) and an output (VOUT). During operation, VOUT is larger than VIN. However, during start-up or if VOUT is shorted to ground, VOUT is smaller than VIN. The boost converter 100 includes an inductor L1, a switching transistor M1, and a Schottky diode D1). Current through the inductor L1 is labeled IL. The switching transistor M1 in this example is an N-type Metal Oxide Semiconductor Field Effect Transistor (NMOS transistor). When M1 is on, current IL flows through the inductor L1 and energy is stored in the inductor L1 in its magnetic field. When M1 is turned off, current IL decreases. The energy of the magnetic field also decreases to maintain the current flow towards VOUT (to which the load is coupled). The voltage polarity of the inductor reverses with M1 off and thus VIN is in series with the inductor's voltage and the two voltages add together to provide the larger VOUT voltage to charge the output capacitor Cout through the Schottky diode D1.

The boost converter 100 of FIG. 1 also includes an isolation transistor designated ISO_FET (e.g., an NMOS transistor) coupled between the inductor L1 and the Schottky diode D1. The connection node between the inductor L1 and the ISO_FET is labeled as VP, and the connection node between the ISO_FET and the Schottky diode D1 is labeled as the switch node (SW). The drain of M1 couples to SW and the source of M1 is couple to ground. When M1 is on, SW is pulled to approximately ground. When M1 is off, SW is pulled up to approximately VOUT.

The boost converter 100 further includes an ISO_FET control circuit 120, an average current control circuit 130, a transconductance amplifier 102, a voltage-to-current (V2I) converter 104, and a PWM circuit 106. The ISO_FET control circuit 120 turns on the ISO_FET during normal operation, during which the ISO_FET operates in the linear region. Because the ISO_FET operates in the linear region, the ISO_FET represents a resistance between VP and SW, and thus functions as a sense resistor to produce a voltage between its drain and source that is proportional to IL. The average current control circuit 130 produces a current (IAVG_SNS) that is proportional to the average of IL and uses IAV_SNS to control the compensation (COMP) signal to the PWM circuit 106 to thereby control the duty cycle of M1. If the average level of IL increases, the average current control circuit 130 responds by decreasing the duty cycle of the PWM circuit 106 to cause the average level of IL to decrease. If the average level of IL decreases, the average current control circuit 130 responds by increasing the duty cycle of the PWM circuit 106 to cause the average level of IL to increase. The operation of the ISO FET control circuit 120 and the average current control circuit 130 is further explained below.

Resistors R1 and R2 are coupled in series between VOUT and ground and produce a scaled-down version of VOUT on feedback node FB to a negative input of the transconductance amplifier 102. The positive input of the transconductance amplifier is coupled to a reference voltage VREF. The output of the transconductance amplifier is the compensation signal COMP, which is converted to a current by V2I 104. The current from V2I 104 flows into a resistor R6, which converts the current to a voltage and which is coupled to the positive input of the PWM circuit 106. The negative input of the PWM circuit 106 is coupled to drain of M1. When M1 is on, current flows through M1 and, due to its drain-to-source resistance, a voltage (albeit relatively low) is produced on the drain of M1 that is proportional to the current through the inductor L1. Thus, the drain voltage of M1 is a current sense signal (ISNS).

The ISO FET control circuit 120 includes a VMAX circuit 122 coupled to an ISO FET driver 124. The VMAX circuit includes one or more comparators. The input signals to the VMAX circuit 122 are VIN and VOUT. The VMAX circuit 122 produces two output control signals—VMAX and VOUT_HI. VMAX is a voltage that is approximately equal to the larger of VIN and VOUT. That is, VMAX is approximately equal to VOUT during normal operation in which VOUT is larger than VIN, and VMAX is approximately equal to VIN during start-up or VOUT short-circuit conditions (when VIN is larger than VOUT). VMAX and VOUT_HI are provided to ISO FET driver 124. The control signal to turn on M1 is LSD_ON, and LSD_ON is also provided as input signal to the ISO FET driver 124. Further, both VP and SW are coupled to the ISO FET driver 124. An example implementation of the ISO_FET driver 124 is shown in FIG. 2 and described in detail below.

Referring still to FIG. 1, the average current control circuit 130 includes a high side (HSD) current sense circuit 132, a current reference circuit ILIM ("ILIM" refers both to the current reference circuit as well as to the magnitude of the current it produces), a current amplifier 134, resistor R4, capacitor C2, and transistor M2. Transistor M2 in this example is a P-type Metal Oxide Semiconductor Field Effect Transistor (PMOS transistor). The output of the HSD current circuit 132 is a current IAVG_SNS that is proportional to the average IL current. If the input current to the current amplifier 134 is labeled ERR. If IAVG_SNS is larger than ILIM, then ERR is a positive current that is the difference between IAVG_SNS and ILIM that flows into the current amplifier 134. If IAVG_SNS is smaller than ILIM, then ERR flows in the opposite direction (i.e., from the current amplifier 134 through ILIM to ground), and the sum of ERR and IAVG_SNS equals ILIM in this state. The current amplifier 134 is an inverting current amplifier the output of which controls the gate of M2. When the average IL current increases, the voltage on the gate of M2 decreases further turning M2 harder and pulling COMP lower to decrease the duty cycle of M1 and thus decrease IL. When the average IL current decreases, the voltage on the gate of M2 also increases further turning M2 off and allowing COMP to increase the duty cycle of M1 and thus increase IL.

Figure 2:
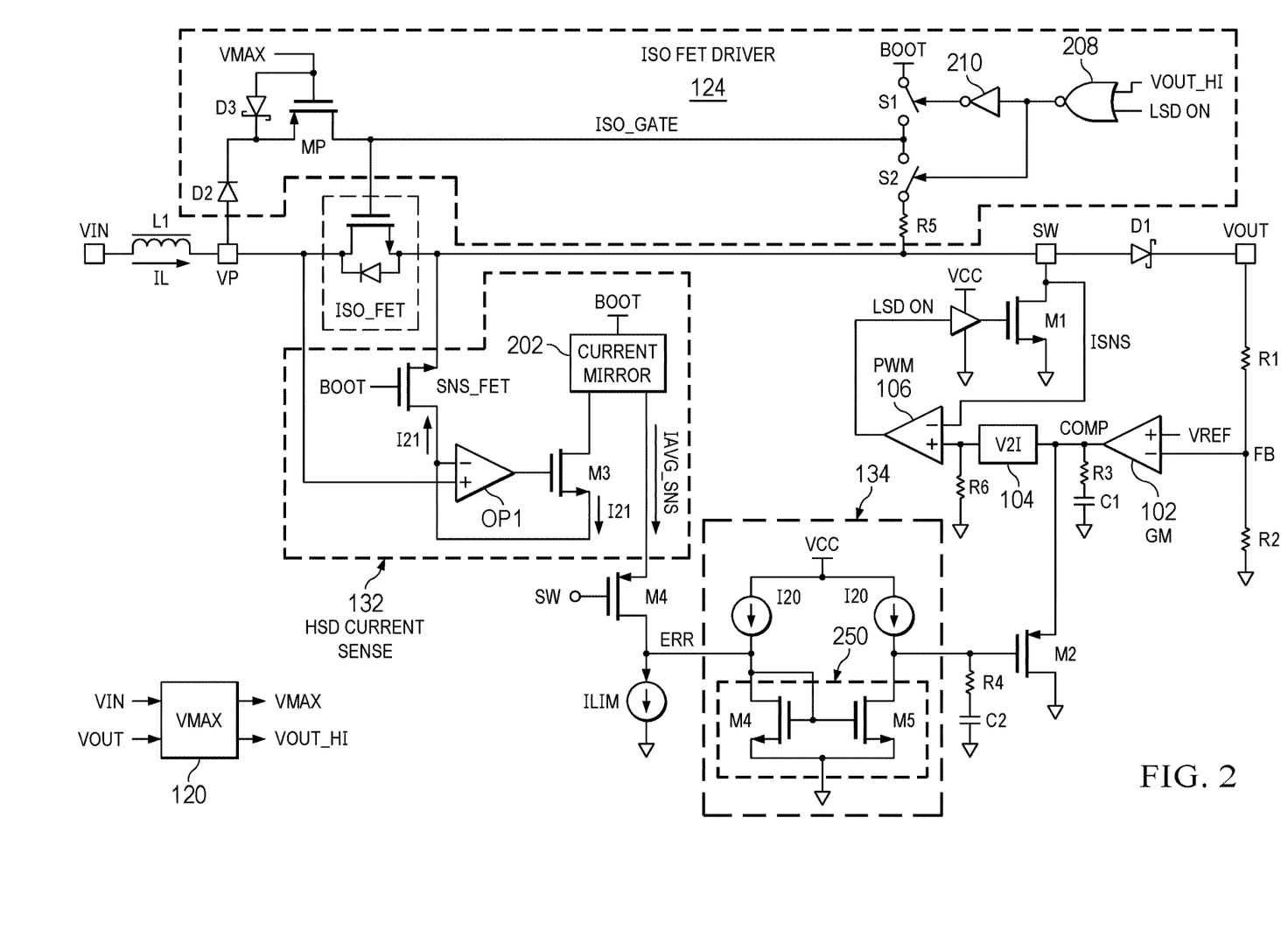
FIG. 2 is a more detailed schematic of the boost converter of FIG. 1 in accordance with an example.

Referring to the more detailed schematic of FIG. 2, the ISO FET driver 124 includes a diode D2, a Zener diode Z2, a PMOS transistor MP, switches S1 and S2 (both of which are transistors), a NOR gate 208, and an inverter 210. VOUT_HI is coupled to one input of inverter 208 and LSD_ON is coupled to the other inverter input. The output of NOR gate 208 is coupled to and controls the on/off state of S2. The output of NOR gate 208 is coupled to the input of inverter 210, and the output of inverter 210 is coupled to and controls the on/off state of S1. Accordingly, when S1 is on, S2 is off, and when S2 is on, S1 is off.

When on (closed), S1 couples a boot strap voltage BOOT to the gate of the ISO_FET. BOOT is generated by bootstrap circuit (not shown) and is a predefined voltage above the voltage of SW. In one example, BOOT is 5V greater than SW. The source of the ISO_FET is coupled to SW. When S1 is turned on, the gate-to-source voltage (Vgs) of the ISO_FET is the BOOT voltage. In the example in which BOOT is SW+5V, the Vgs of the ISO_FET is 5V when S1 is on.

VMAX 122 forces VOUT_HI to be logic "1" responsive to VOUT being greater than VIN (normal boost operation). With one input of NOR gate being logic "1", the output of NOR gate is logic "0" thereby turning off S2. The logic 0 from NOR gate 208, however, is inverted to a logic 1 by inverter 210 thereby turning on S1. ISO_FET is on and operating in the linear region, and functions as a current sense resistance to sense the inductor current (IL).

Referring still to FIG. 2, the HSD current sense circuit 132 includes a sense transistor (SNS_FET), an operational amplifier OP1, an NMOS transistor M3, and a current mirror 202. Current mirror 202 includes, for example, a pair of PMOS transistors configured to function as a current mirror. The current that flows through M3 is mirrored as IAVG_SNS through M4 to ILIM and the current amplifier 134.

The source of SNS_FET is coupled to SW and to the BOOT voltage. The source of the SNS_FET is coupled to the source of the ISO_FET and to SW. The inverting (−) input of OP1 is coupled to the drain of the SNS_FET, and the non-inverting (+) input of OP1 is coupled to the drain of the ISO_FET. The drain of the ISO_FET is coupled to node VP. Because the voltage difference between the inverting and non-inverting inputs of an operational amplifier is approximately 0V, the drain of the SNS_FET is approximately equal to VP as well. When M1 is on, the ISO_FET operates in the linear region as noted above. The SNS_FET also operates in the linear region. The SNS_FET is a smaller transistor (size referring to the ratio of channel width (W) to channel length (L)). With their sources, drains, and gates having the same voltages, the current through the SNS_FET is proportional to, but smaller than, the current through the ISO_FET (IL). The current through the SNS_FET is labeled as I21 in FIG. 2. The current mirror 202 provides the current I21 through M3 and through the SNSN_FET to SW.

The current mirror 202 also mirrors I21 as IAVG_SNS through M4 to ILIM/current amplifier 134. The current amplifier 134 includes a current mirror 250 formed by the two NMOS transistors M4 and M5. Current sources 120 provide, in one embodiment, the same current. If IAVG_SNS is greater than ILIM, the excess current (the difference between IAVG_SNS and ILIM) flows into drain of M4 along with I20. In one embodiment, the mirror ratio of current mirror 250 is 1:1, and thus the current that flows through M4 also flows thorough M5. Accordingly, if IAVG_SNS is greater than ILIM, the drain current of M5 is larger than I20 and thus current flows from the gate of M2 thereby discharging gate of M2, which pulls COMP lower. Reciprocally, if IAVG_SNS is smaller than ILIM, the drain current of M5 is smaller than I20 and the excess current (I20 less the drain current of M5) flows into the gate of M2 thereby charging its gate and transitioning M2 closer to the fully off state and thereby allowing COMP to increase.

Figure 3:
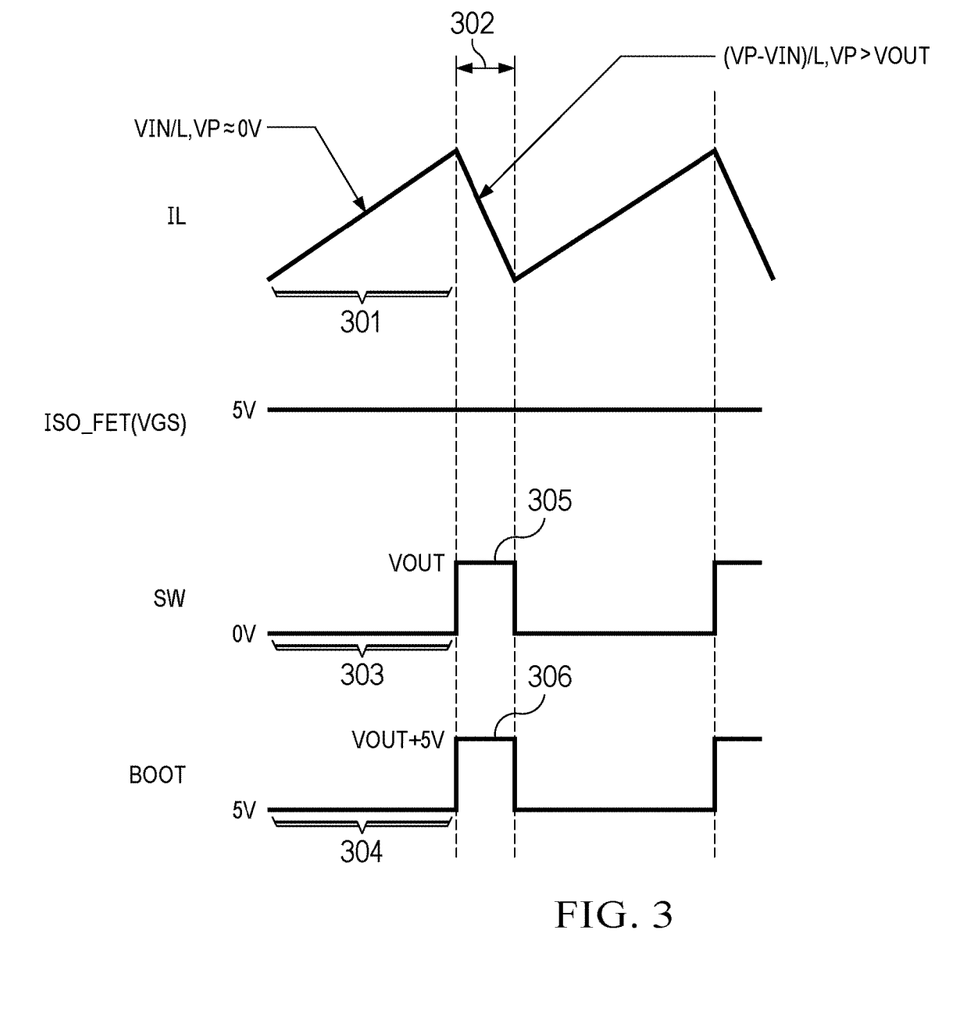
FIG. 3 is a timing diagram illustrating the operation of the boost converter during normal operation (when the output voltage is larger than the input voltage) in accordance with an example.

FIG. 3 is a timing diagram illustrating the operation of boost converter during normal operation in which VOUT is greater than VIN. The timing diagram includes sample waveforms for inductor current IL, the Vgs of the ISO_FET, the voltage of SW, and the BOOT voltage. When M1 is on, the inductor current IL increases as shown at 301. In one example, the BOOT voltage is 5V greater than the SW voltage, and thus the Vgs of the ISO_FET is 5V regardless as to whether M1 is on or off. With M1 being on, the SW voltage is approximately 0 V (as shown at 303) and thus the BOOT voltage is approximately 5V as shown at 304. When M1 is off, IL decreases as shown at 302, the SW voltage jumps up to approximately VOUT as shown at 305, and thus the BOOT voltage increases to VOUT plus 5V as shown at 306.

During a start-up process, VIN will be greater than VOUT. VIN will also be larger than VOUT if VOUT were to be shorted to ground. Responsive to VIN being greater than VOUT, VMAX 122 forces VOUT_HI to be logic 0. With VOUT_HI being a 0, the output of NOR gate 208 is the logical inverse of LSD_ON. LSD_ON being a 1 causes M1 to turn on, and LSD_ON being a 0 causes M1 to turn off. Thus, when M1 is on (LSD_ON is a 1), the output of NOR gate 208 is a 0, which causes S2 to be off and, via inverter 210, S1 to be on. Alternatively stated, when M1 is on, S1 also is on thereby coupling the BOOT voltage to the gate of the ISO_FET. Reciprocally, when M1 is off (LSD_ON is a 0) when VIN is greater than VOUT, the output of NOR gate 208 is a 1, which causes S2 to be on and S1 to be off. Alternatively stated, when M1 is off, S2 is on (and S1 is off) and the gate of the ISO_FET is coupled through resistor R5 to SW. A control loop is created in this configuration to control the gate voltage of the ISO_FET to cause the ISO_FET to operate in the saturation region with a Vgs that regulates the current through the ISO_FET to approximately equal IL (which decreases when M1 is off). This control loop is further described below.

When VIN is greater than VOUT, VOUT_HI is 0, and the control loop operates according to two phases. One phase is when M1 is on (LSD_ON is 1). The other phase is when M1 is off (LSD_ON is 0), and is described below. When M1 is on, SW is approximately equal to ground, LSD_ON is 1, and the output of NOR gate 208 is 0. As a result, S2 is off and S1 is on. With S1 being on, the BOOT voltage is coupled to the gate of the ISO_FET.

When M1 is off, LSD_ON is 0. With both VOUT_HI and LSD_ON being 0, the output of NOR gate is a 1, which closes S2, and via inverter 210, opens S1. In this configuration, the gate of the ISO_FET is coupled to SW via resistor R5. The gate of MP is VMAX (the larger of VIN or VOUT). With VIN being greater than VOUT, VMAX is VIN and thus the gate of MP is VIN. The Vgs voltage of the ISO_FET decreases with the resistance of R5 as the load, so the drain-to-source on-resistance of the ISO_FET increases. The VP voltage will increase if the inductor current is not changed (the loop response is fast and thus the inductor current is generally unchanged). Once the VP voltage increases to higher than VIN by the sum of the forward voltage drop of diode D2 and the Vgs of MP, the MP transistor begins conducting and the source current flows through R5 to pull up the Vgs of the ISO_FET. Accordingly, a negative feedback loop is formed by the combination of MP, R5 and the ISO_FET. VP is approximately equal to the voltage on the gate of MP (VIN) plus the Vgs of MP plus the forward voltage drop across diode D2. The ISO_FET operates in the saturation region with a Vgs in the range of approximately 1 to 2 V.

Figure 4:
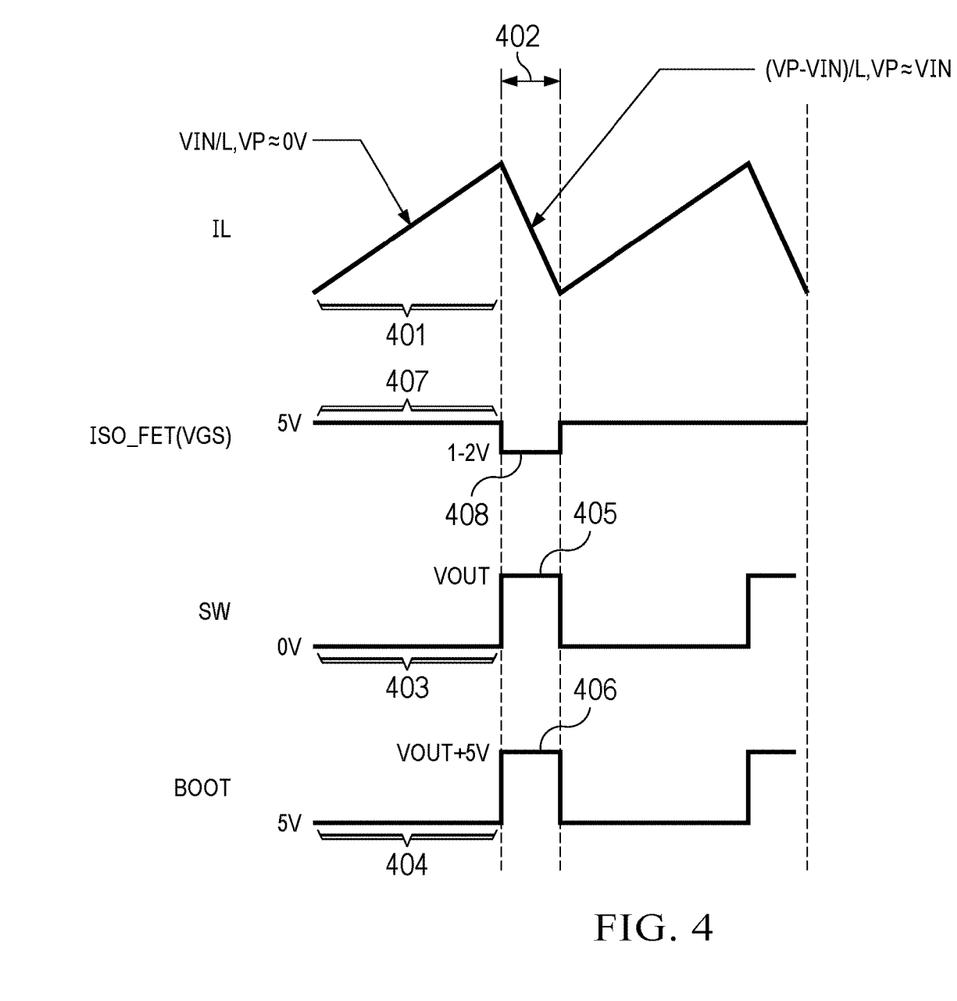
FIG. 4 is a timing diagram illustrating the operation of the boost converter during startup or during an output short-circuit condition (when the output voltage is smaller than the input voltage) in accordance with an example.

FIG. 4 is a timing diagram illustrating the operation of boost converter during operation in which VOUT is smaller than VIN. The timing diagram includes sample waveforms for inductor current IL, the Vgs of the ISO_FET, the voltage of SW, and the BOOT voltage. When M1 is on, the inductor current IL increases as shown at 401. In the example discussed above, the BOOT voltage is 5V greater than the SW voltage. With M1 being on, the SW voltage is approximately 0 V (as shown at 403) and thus the BOOT voltage is approximately 5V as shown at 404. When M1 is off, S1 is off and S2 is on as explained above. IL decreases as shown at 402. The SW voltage jumps up to approximately VOUT as shown at 405, and thus the BOOT voltage increases to VOUT plus 5V as shown at 406. The Vgs of the ISO_FET is approximately equal to 5V when M1 is on and S1 is closed as shown at 407 but decreases to 1-2V as shown at 408 as controlled by the control loop described above.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead. For example, a p-type metal-oxide-silicon field effect transistor ("MOSFET") may be used in place of an n-type MOSFET with little or no changes to the circuit. Furthermore, other types of transistors may be used (such as bipolar junction transistors (BJTs)).

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially"

preceding a value means+/−10 percent of the stated value. Modifications are possible in the described examples, and other examples are possible within the scope of the claims.

Modifications are possible in the described embodiments, and other embodiments are possible, within the scope of the claims.

What is claimed is:

1. A circuit comprising:
   a control circuit having a control circuit input, a first control circuit output, and a second control circuit output;
   a first transistor having a first current terminal, a second current terminal, and a control terminal, the control terminal coupled to the first control circuit output, the first current terminal coupled to the control circuit input and to a second transistor, and the second current terminal configured to be coupled to the second transistor;
   a logic circuit having a logic input and a logic output, the logic input coupled to the second control circuit output; and
   a switch having a switch terminal and a switch control terminal, the switch control terminal coupled to the logic output and the switch terminal coupled to the second current terminal.

2. The circuit of claim 1, wherein the control circuit input is a first control circuit input and the first control circuit input is configured to receive an input voltage and a second control circuit input of the control circuit is configured to receive an output voltage.

3. The circuit of claim 1, wherein the control circuit input is a first control circuit input and the control circuit is configured to:
   receive a first voltage at the first control circuit input;
   receive a second voltage at a second control circuit input of the control circuit;
   produce a third voltage at the first control circuit output, wherein the third voltage is a maximum of the first voltage and the second voltage; and
   produce a logic signal at the second control circuit output based on a comparison of the first voltage and the second voltage.

4. The circuit of claim 1, wherein the switch control terminal is a first switch control terminal, the switch terminal is a first switch terminal, the logic input is a first logic input, the circuit further comprising a second switch having a second switch terminal, a third switch terminal, and a second switch control terminal, the second switch terminal coupled to the first switch terminal, the logic circuit further comprising:
   a first logic gate having a first logic gate input, a second logic gate input, and a first logic gate output, the first logic gate input coupled to the first logic input, the second logic gate input coupled to a second logic input of the first logic gate, and the first logic gate output coupled to the logic output; and
   a second logic gate having a third logic gate input and a second logic gate output, the third logic gate input coupled to the first logic gate output and the second logic gate output coupled to the second switch control terminal.

5. The circuit of claim 4, wherein the control terminal is a first control terminal, the circuit further comprising:
   the second transistor having a third current terminal, a fourth current terminal, and a second control terminal, the third current terminal coupled to the first current terminal and the fourth current terminal coupled to the second current terminal.

6. The circuit of claim 5, further comprising a current control circuit having a first current control input, a second current control input, and a current control output, the first current control input coupled to the third current terminal, the second current control input coupled to the fourth current terminal, and the current control output configured to be coupled to a voltage converter.

7. The circuit of claim 5, wherein the control circuit input is a first control circuit input, the circuit further comprising:
   a third transistor having a fifth current terminal, a sixth current terminal, and a third control terminal, the fifth current terminal coupled to the fourth current terminal, the fifth current terminal coupled to a second control circuit input of the control circuit, and the third control terminal coupled to a second logic input of the first logic gate; and
   an inductor having a first inductor terminal and a second inductor terminal, the first inductor terminal coupled to the first control circuit input and the second inductor terminal coupled to the third current terminal.

8. A circuit comprising:
   a first transistor having a first current terminal and a second current terminal, the first current terminal and the second current terminal configured to be coupled to a second transistor;
   an operational amplifier (op amp) having a first op amp input, a second op amp input, and an op amp output, the first op amp input coupled to the second current terminal and the second op amp input configured to be coupled to the second transistor;
   a third transistor having a third current terminal, a fourth current terminal, and a control terminal, the control terminal coupled to the op amp output and the fourth current terminal coupled to the second current terminal;
   a current mirror having a first current mirror terminal and a second current mirror terminal, the first current mirror terminal coupled to the third current terminal; and
   a fourth transistor having a fifth current terminal coupled to the second current mirror terminal.

9. The circuit of claim 8, further comprising:
   a current source coupled to a sixth current terminal of the fourth transistor.

10. The circuit of claim 9, wherein the control terminal is a first control terminal, the circuit further comprising:
    a current amplifier having a first current amplifier terminal and a second current amplifier terminal, the first current amplifier terminal coupled to the sixth current terminal; and
    a fifth transistor having a seventh current terminal, an eighth current terminal, and a second control terminal, the second control terminal coupled to the second current amplifier terminal.

11. The circuit of claim 10, wherein the current source is a first current source, the current mirror is a first current mirror, and the current amplifier comprises:
    a second current mirror having a third current mirror terminal and a fourth current mirror terminal, the third current mirror terminal coupled to the first current amplifier terminal and the fourth current mirror terminal coupled to the second current amplifier terminal;
    a second current source coupled to the third current mirror terminal; and
    a third current source coupled to the fourth current mirror terminal.

12. The circuit of claim 8, wherein the first transistor, the op amp, and the third transistor are configured to detect current through the second transistor.

13. The circuit of claim 8, further comprising:
the second transistor having a sixth current terminal, a seventh current terminal, and a third control terminal, the sixth current terminal coupled to the second op amp input and the seventh current terminal coupled to the first current terminal; and
a transistor driver having a first driver terminal, a second driver terminal, and a third driver terminal, the first driver terminal coupled to the sixth current terminal, the second driver terminal coupled to the third control terminal, and the third driver terminal coupled to the seventh current terminal.

14. A circuit comprising:
a transistor having a first current terminal, a second current terminal, and a control terminal;
a transistor driver having a first driver input, a second driver input, a third driver input, and a driver output, the first driver input coupled to the first current terminal, the second driver input coupled to the second current terminal, and the driver output coupled to the control terminal; and
a current sense circuit having a first current sense input and a second current sense input, the first current sense input coupled to the first current terminal, and the second current sense input coupled to the second current terminal; and
a transistor control circuit having a first transistor control output and a second transistor control output, the first transistor control output coupled to a fourth transistor driver input of the transistor driver, and the second transistor control output coupled to the third driver input of the transistor driver.

15. The circuit of claim 14, wherein the transistor is a first transistor and the control terminal is a first control terminal, the circuit further comprising:
a second transistor having a third current terminal, a fourth current terminal, and a second control terminal, the third current terminal coupled to the second current terminal, and the second control terminal coupled to a third input terminal of the transistor driver; and
an inductor having a first inductor terminal and a second inductor terminal, the second inductor terminal coupled to the first current terminal.

16. The circuit of claim 15, wherein the first inductor terminal is coupled to the first control terminal and the third current terminal is coupled to a transistor control input of the transistor control circuit.

17. The circuit of claim 14, wherein the transistor is a first transistor and the control terminal is a first control terminal, the circuit further comprising:

a current source coupled to a current sense output of the current sense circuit;
a current amplifier having a current amplifier input and a current amplifier output, the current amplifier input coupled to the current sense output; and
a second transistor having a third current terminal, a fourth current terminal, and a second control terminal, the second control terminal coupled to the current amplifier output.

18. The circuit of claim 17, further comprising:
a voltage-to-current (V2I) converter having a V2I input and a V2I output, the V2I input coupled to the third current terminal;
a pulse width modulation (PWM) circuit having a first PWM input, a second PWM input, and a PWM output, the second PWM input coupled to the V2I output; and
a third transistor having a fifth current terminal, a sixth current terminal, and a third control terminal, the third control terminal coupled to the PWM output, the fifth current terminal coupled to the first PWM input and to the second driver input.

19. The circuit of claim 14, wherein the transistor is a first transistor and the control terminal is a first control terminal, and the current sense circuit comprises:
a second transistor having a third current terminal, a fourth current terminal, and a second control terminal, the third current terminal coupled to the second current terminal;
an operational amplifier (op amp) having a first op amp input, a second op amp input, and an op amp output, the first op amp input coupled to the fourth current terminal and the second op amp input coupled to the first current terminal; and
a third transistor having a fifth current terminal, a sixth current terminal, and a third control terminal, the third control terminal coupled to the op amp output and the sixth current terminal coupled to the first op amp input.

20. The circuit of claim 14, wherein the transistor is a first transistor, the control terminal is a first control terminal, and the transistor driver comprises:
a second transistor having a third current terminal, a fourth current terminal, and a second control terminal, the third current terminal coupled to the first current terminal;
a switch having a first switch terminal, a second switch terminal, and a switch control terminal, the first switch terminal coupled to the fourth current terminal; and
a logic circuit having a first logic input, a second logic input, and a logic output, the logic output coupled to the switch control terminal.

\* \* \* \* \*